(12) United States Patent
Jang et al.

(10) Patent No.: US 9,627,662 B2
(45) Date of Patent: Apr. 18, 2017

(54) SECONDARY BATTERY

(71) Applicant: SAMSUNG SDI CO., LTD., Yongin-si, Gyeonggi-do (KR)

(72) Inventors: Jae-Soon Jang, Yongin-si (KR); Seok-Joon Yoon, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 225 days.

(21) Appl. No.: 14/534,401

(22) Filed: Nov. 6, 2014

(65) Prior Publication Data

US 2015/0236331 A1    Aug. 20, 2015

(30) Foreign Application Priority Data

Feb. 20, 2014    (KR) .......................... 10-2014-0019688

(51) Int. Cl.
 *H02J 7/00* (2006.01)
 *H01M 2/06* (2006.01)
 *H01M 2/30* (2006.01)
 *H01M 2/34* (2006.01)
(52) U.S. Cl.
 CPC ............... *H01M 2/06* (2013.01); *H01M 2/30* (2013.01); *H01M 2/345* (2013.01)
(58) Field of Classification Search
 CPC ........... H01M 2/06; H01M 2/30; H01M 2/345
 USPC .......................................................... 320/112
 See application file for complete search history.

(56) References Cited

U.S. PATENT DOCUMENTS

| 2010/0143789 | A1 | 6/2010 | Kim | |
| 2010/0291421 | A1 | 11/2010 | Byun et al. | |
| 2012/0214054 | A1* | 8/2012 | Yoon | H01M 2/0404 429/186 |
| 2012/0258340 | A1* | 10/2012 | Park | H01M 10/44 429/61 |
| 2013/0130072 | A1 | 5/2013 | Guen | |
| 2013/0136962 | A1 | 5/2013 | Seong et al. | |

FOREIGN PATENT DOCUMENTS

| KR | 10-2010-0064668 | 6/2010 |
| KR | 10-2010-0123598 | 11/2010 |
| KR | 10-2013-0054845 | 5/2013 |
| KR | 10-2013-0060723 | 6/2013 |

\* cited by examiner

*Primary Examiner* — Paul Dinh
(74) *Attorney, Agent, or Firm* — Lee & Morse P.C.

(57) ABSTRACT

A secondary battery includes an electrode assembly, a case that accommodates the electrode assembly, a cap plate that seals the case, an electrode terminal assembled to penetrate through the cap plate, and a short-circuit inducing member that is fixed to a top surface of the cap plate, the short-circuit inducing member being displaceable according to a deformation of the cap plate to induce a short-circuit by contact with the electrode terminal.

11 Claims, 8 Drawing Sheets

SECONDARY BATTERY

CROSS-REFERENCE TO RELATED APPLICATION

Korean Patent Application No. 10-2014-0019688, filed on Feb. 20, 2014, in the Korean Intellectual Property Office, and entitled: "Secondary Battery," is incorporated by reference herein in its entirety.

BACKGROUND

1. Field

One or more embodiments relate to a secondary battery.

2. Description of the Related Art

With the development of technology and the increase in production of mobile devices, such as mobile phones and laptops, the demand for secondary batteries as energy sources is rapidly increasing. Secondary batteries for electric cars and hybrid cars are being actively studied as energy sources for replacing fossil fuel.

SUMMARY

Embodiments are directed to a secondary battery including an electrode assembly, a case that accommodates the electrode assembly, a cap plate that seals the case, an electrode terminal assembled to penetrate through the cap plate, and a short-circuit inducing member that is fixed to a top surface of the cap plate, the short-circuit inducing member being displaceable according to a deformation of the cap plate to induce a short-circuit by contact with the electrode terminal.

The short-circuit inducing member may be electrically connected to the cap plate and spaced apart from the electrode terminal.

The short-circuit inducing member may be fixedly combined to the top surface of the cap plate.

The cap plate and the electrode terminal may be respectively electrically connected to electrode plates of the electrode assembly that have opposite polarities.

The short-circuit inducing member may face the electrode terminal.

A pair of the short-circuit inducing members may face each other at symmetrical locations with respect to the electrode terminal.

The short-circuit inducing member may surround a corner portion of the electrode terminal.

The short-circuit inducing member may include a base portion having a relatively wide width, the base portion being disposed on the top surface of the cap plate, and a protruding portion having a relatively narrow width, the protruding portion protruding from the base portion towards above the cap plate.

The base portion and the protruding portion may together form a stepped portion. The stepped portion provides a space that accommodates a corner portion of the electrode terminal.

The base portion may face a bottom surface of the electrode terminal and the protruding portion may face a side surface of the electrode terminal. The short-circuit inducing member may surround a corner portion of the electrode terminal where the bottom surface and the side surface of the electrode terminal meet.

The protruding portion and the side surface of the electrode terminal may contact each other and induce a short-circuit during compressive deformation of the cap plate. The base portion and the bottom surface of the electrode terminal may contact each other and induce a short-circuit during bending deformation of the cap plate.

The electrode terminal may have a rectangular shape having a pair of short side portions and a pair of long side portions. A pair of the short-circuit inducing members may be disposed to face the pair of short side portions. A pair of the short-circuit inducing members may be disposed to face the pair of long side portions. The short-circuit inducing member may include a pair of members disposed to face the pair of long side portions, and a pair of members disposed to face the pair of short side portions.

The short-circuit inducing member may have a closed-loop shape and may surround the electrode terminal.

An insulating gasket may be on the top surface of the cap plate, together with the short-circuit inducing member. The insulating gasket may include an exposing portion that exposes the short-circuit inducing member.

The insulating gasket may cover and insulate the cap plate and may expose the short-circuit inducing member to the electrode terminal.

The insulating gasket may include a first portion inserted into a terminal hole of the cap plate through which the electrode terminal penetrates, and a second portion formed at the top surface of the cap plate and extending from the first portion.

The second portion may include the exposing portion.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 1:
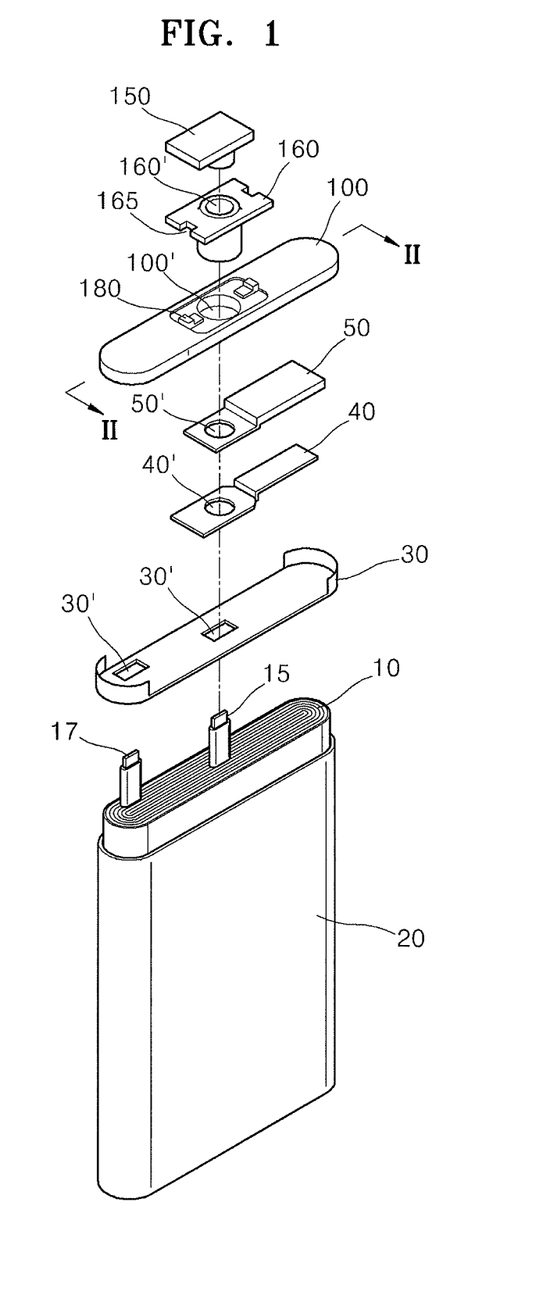
FIG. 1 illustrates an exploded perspective view of a secondary battery according to an embodiment.
Figure 2:
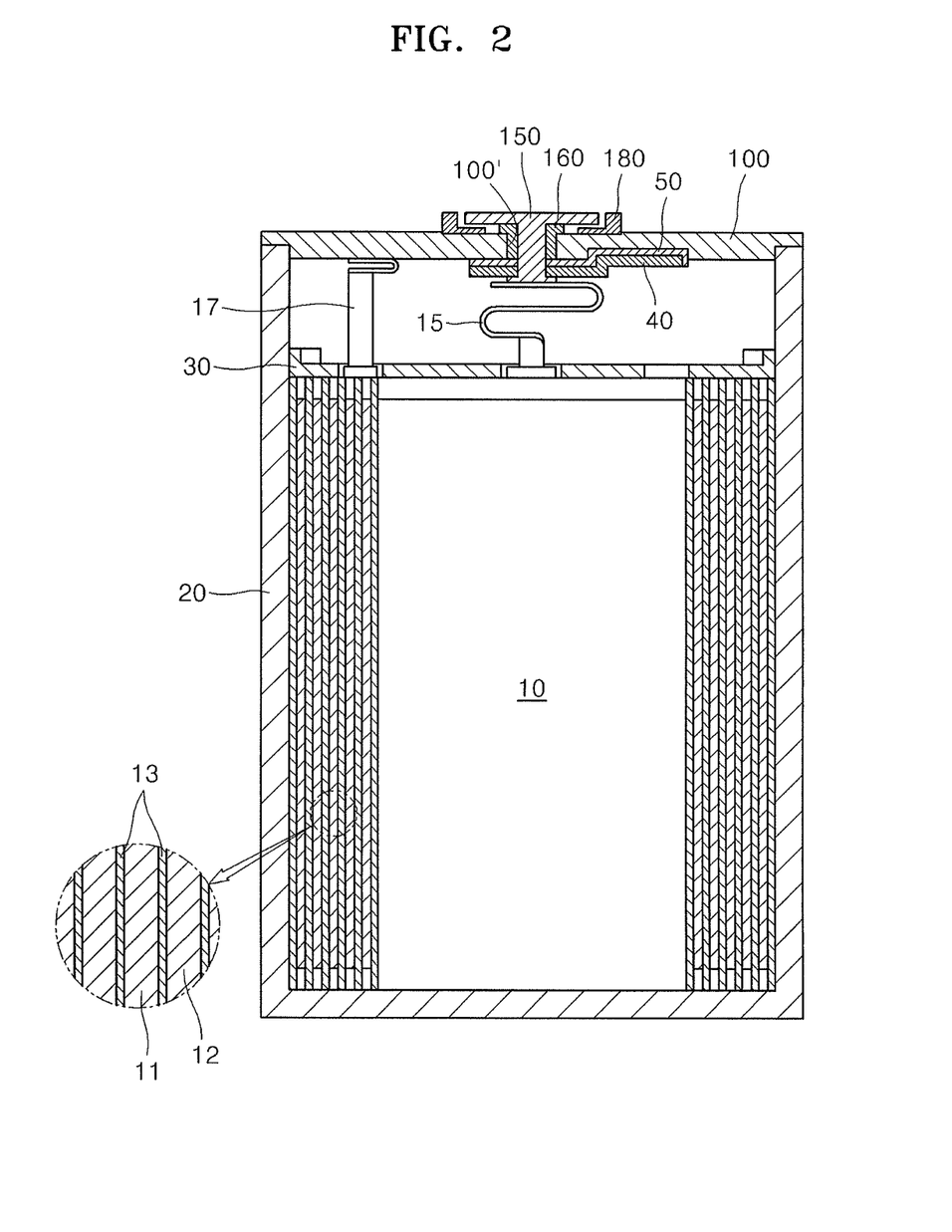
FIG. 2 illustrates a cross-sectional view taken along a line II-II of FIG. 1.

FIG. 1 illustrates an exploded perspective view of a secondary battery according to an embodiment. FIG. 2 illustrates a cross-sectional view taken along a line II-II of FIG. 1.

Referring to FIGS. 1 and 2, the secondary battery includes an electrode assembly 10, a case 20 accommodating the electrode assembly 10, a cap plate 100 sealing an upper opening of the case 20, and an electrode terminal 150 provided at a terminal hole 100' of the cap plate 100.

The secondary battery is a rechargeable battery, and may be formed by sealing the electrode assembly 10 including a first electrode plate 11, a second electrode plate 12, and a separator 13 of FIG. 2 inside the case 20, together with an electrolyte (not shown). For example, the second battery may include the electrode assembly 10 obtained by forming a stacked structure in which the separator 13 that is formed of an electric insulating material is disposed between the first and second electrode plates 11 and 12 having opposite polarities, and then winding the stacked structure in a jelly-roll shape. The case 20 may have an opened top portion to accommodate the electrode assembly 10 and the electrolyte, and the cap plate 100 for sealing the opened top portion of the case 20.

A first electrode tab 15 and a second electrode tab 17 may be respectively connected to at least one location of the first electrode plate 11 and at least one location of the second electrode plate 12 of the electrode assembly 10. The first and second electrode tabs 15 and 17 are drawn from the electrode assembly 10 to form charging and discharging paths of the electrode assembly 10.

For example, the first electrode tab 15 may be connected to the electrode terminal 150, which protrudes towards a top surface of the cap plate 100 while being insulatively combined to the cap plate 100, and the second electrode tab 17 may be connected to the cap plate 100 itself.

The electrode terminal 150 may be assembled by being inserted into the terminal hole 100' of the cap plate 100. The electrode terminal 150 may be assembled to penetrate the cap plate 100, and may include an upper portion exposed on the cap plate 100 and a lower portion electrically connected to the electrode assembly 10, for example, the first electrode tab 15 below the cap plate 100.

The electrode terminal 150 may be coupled to the terminal hole 100' via an insulating gasket 160. For example, the insulating gasket 160 may be disposed between the electrode terminal 150 and the cap plate 100, which have opposite polarities, to prevent an electric short-circuit. Also, the insulating gasket 160 may form a seal around the terminal hole 100' such that external harmful components do not penetrate into the secondary battery through the cap plate 100.

The insulating gasket 160 may extend from the terminal hole 100' to the top surface of the cap plate 100. For example, the insulating gasket 160 may be disposed on the cap plate 100 to provide electric insulation between the cap plate 100 and the electrode terminal 150. As described below, the insulating gasket 160 may be designed to provide electric insulation between the electrode terminal 150 and the cap plate 100 while still allowing a short-circuit to be formed between the electrode terminal 150 and a short-circuit inducing member. For example, the insulating gasket 160 may include an exposing portion 165, as illustrated in FIG. 1, for exposing the short-circuit inducing member 180, as will be described in detail below.

The electrode terminal 150 may be electrically connected to a terminal plate 40 disposed below the cap plate 100. An insulating plate 50 may be disposed between the cap plate 100 and the terminal plate 40 to provide electric insulation therebetween. For example, the electrode terminal 150 may be electrically connected to the first electrode tab 15 by penetrating through terminal holes 40' and 50' of FIG. 1 formed in the terminal plate 40 and the insulating plate 50.

An insulating case 30 may be disposed between the electrode assembly 10 and the terminal plate 40. For example, the insulating case 30 may be disposed between the electrode assembly 10 and the terminal plate 40, which have opposite polarities, to electrically insulate the electrode assembly 10 and the terminal plate 40 from each other. For example, the insulating case 30 may be disposed between a positive electrode of the electrode assembly 10 and a negative electrode of the terminal plate 40 to prevent an electric short-circuit from being formed therebetween. For example, a tab hole 30' through which the first and second electrode tabs 15 and 17 penetrate may be formed in the insulating case 30.

In the current embodiment, the short-circuit inducing member 180 may be formed at the cap plate 100. For example, the short-circuit inducing member 180 may protrude from the top surface of the cap plate 100. The short-circuit inducing member 180 may be fixed to the top surface of the cap plate 100 so as to follow deformation of the cap plate 100. Accordingly, the short-circuit inducing member 180 may be displaced corresponding to deformation of the cap plate 100 during compressive deformation or bending deformation of the cap plate 100, and thus may induce an electric short-circuit according to contact with the electrode terminal 150, thereby preventing a safety accident, such as an ignition or an explosion of the secondary battery.

The short-circuit inducing member 180 may be electrically connected to the cap plate 100, and, for example, may be integrally formed with the cap plate 100. For example, the short-circuit inducing member 180 may be formed as a component separate from the cap plate 100, and then combined with the cap plate 100 at a certain location of the cap plate 100. For example, the short-circuit inducing member 180 may be fixedly combined with the cap plate 100 at the top surface of the cap plate 100.

The short-circuit inducing member 180 may be spaced apart from the electrode terminal 150 by a predetermined gap. The short-circuit inducing member 180 may be spaced apart from the electrode terminal 150 such that an unshorted state is maintained in a normal operation environment, and when compression or bending deformation occurs in the cap plate 100 due to an external load or the like, the short-circuit inducing member 180 may contact the electrode terminal 150 and generates an electric short-circuit, thereby preventing a safety accident caused by deformation of the secondary battery.

The short-circuit inducing member 180 and the electrode terminal 150 may have opposite polarities. For example, the short-circuit inducing member 180 may be electrically connected to the cap plate 100 to have the same polarity as the cap plate 100. For example, the short-circuit inducing member 180 may have a positive polarity like the second electrode tab 17 connected to the cap plate 100. The electrode terminal 150 may have a negative polarity like the first electrode tab 15. The short-circuit inducing member 180 and the electrode terminal 150, which have opposite polarities as such, may contact each other during deformation of the secondary battery, thereby generating an electric short-circuit.

Figure 3:
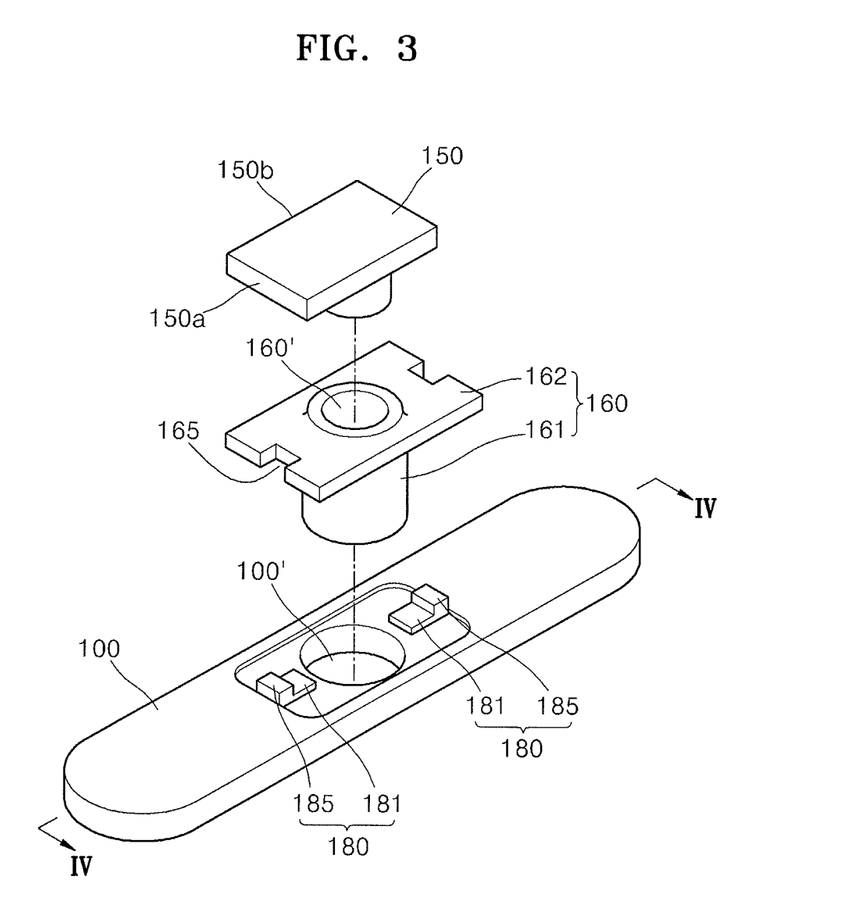
FIG. 3 illustrates an exploded perspective view of a short-circuit inducing member and peripheral components shown in FIG. 1.
Figure 4:
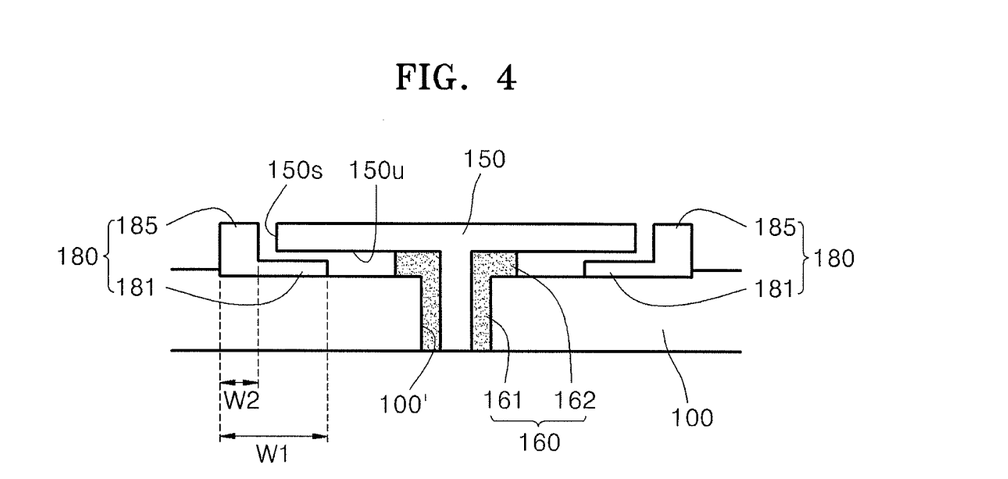
FIG. 4 illustrates a cross-sectional view taken along a line IV-IV of FIG. 3.

FIG. 3 illustrates an exploded perspective view of the short-circuit inducing member 180 and peripheral components shown in FIG. 1. FIG. 4 illustrates a cross-sectional view taken along a line IV-IV of FIG. 3.

Referring to FIG. 3, a pair of the short-circuit inducing members 180 may be formed facing each other and at symmetrical locations based on the electrode terminal 150. For example, when the electrode terminal 150 has a rectangular shape having a pair of short side portions 150*a* and a pair of long side portions 150*b*, the short-circuit inducing members 180 may be disposed at locations of the electrode terminal 150 such that the short-circuit inducing members 180 face the short side portions 150*a* or the long side portions 150*b*.

As described below, the short-circuit inducing member 180 may contact the short side portion 150*a* or the long side portion 150*b* and generate an electric short-circuit during compressive deformation of the secondary battery. For example, in FIG. 3, the short-circuit inducing member 180 may contact the short side portion 150*a* and generate an electric short-circuit.

Referring to FIG. 4, the short-circuit inducing member 180 may surround a corner portion of the electrode terminal 150. In detail, the short-circuit inducing member 180 may include a base portion 181 having a relatively wide width W1 disposed on the cap plate 100, and a protruding portion 185 having a relatively narrow width W2 protruding from the base portion 181. The base portion 181 and the protruding portion 185 may form a stepped portion along a width direction. The stepped portion may provide a space for accommodating the corner portion of the electrode terminal 150.

For example, the base portion 181 may face a bottom surface 150*u* of the electrode terminal 150, the protruding portion 185 may face a side surface 150*s* of the electrode terminal 150. The short-circuit inducing member 180 may entirely surround a corner portion formed by the bottom surface 150*u* and the side surface 150*s* of the electrode terminal 150. As described below, a short-circuit may be generated during compressive deformation of the cap plate 100 as the protruding portion 185 of the short-circuit inducing member 180 and the electrode terminal 150 contact each other. A short-circuit may be generated during bending deformation of the cap plate 100 as the base portion 181 of the short-circuit inducing member 180 and the electrode terminal 150 contact each other. A short-circuit operation of the short-circuit inducing member 180 will be described in detail below.

An assembly structure of the short-circuit inducing member 180 and the insulating gasket 160 will now be described with reference to FIGS. 3 and 4.

The insulating gasket 160, together with the short-circuit inducing member 180, may be formed on the top surface of the cap plate 100. The insulating gasket 160 may include the exposing portion 165 for exposing the short-circuit inducing member 180. For example, the insulating gasket 160 may cover and insulate the cap plate 100 while exposing the short-circuit inducing member 180 to the electrode terminal 150.

In more detail, the insulating gasket 160 may be disposed between the cap plate 100 and the electrode terminal 150 to prevent an electric short-circuit therebetween. The exposing portion 165 of the insulating gasket 160 may expose the short-circuit inducing member 180 so as not to interfere with the short-circuit operation of the short-circuit inducing member 180.

For example, the insulating gasket 160 may include a first portion 161 inserted into the terminal hole 100' of the cap plate 100, and a second portion 162 extending from the first portion 161 to the top surface of the cap plate 100. The exposing portion 165 for exposing the pair of short-circuit inducing members 180 may be formed on two sides of the second portion 162.

The second portion 162 may be disposed between the cap plate 100 and the electrode terminal 150 to electrically insulate the cap plate 100 and the electrode terminal 150 from each other The exposing portion 165 for exposing the pair of short-circuit inducing members 180 may be formed on two sides of the second portion 162 based on the first portion 161 where the electrode terminal 150 is inserted.

Figure 5A:
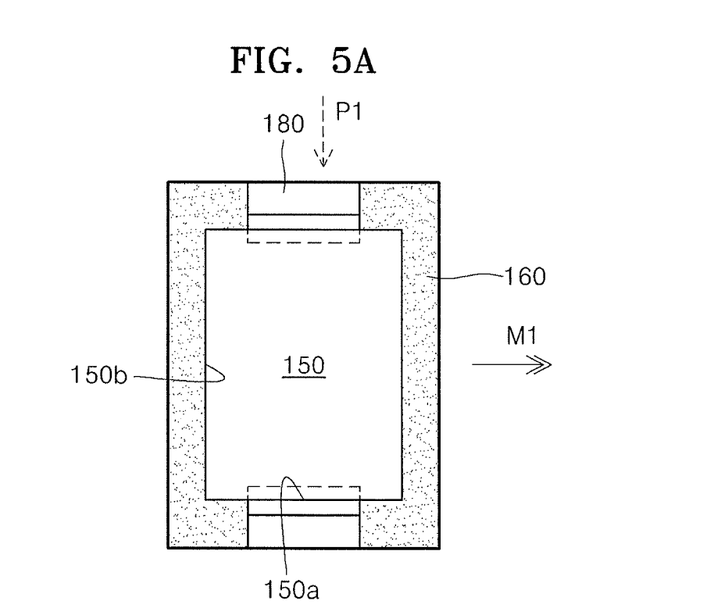
FIGS. 5A through 5E illustrate various arrangement structures of the short-circuit inducing member.
Figure 5B:
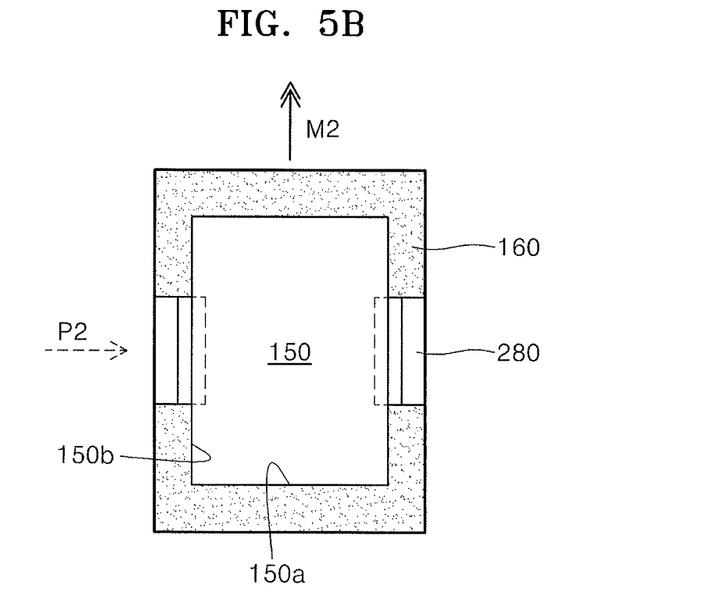
Figure 5C:
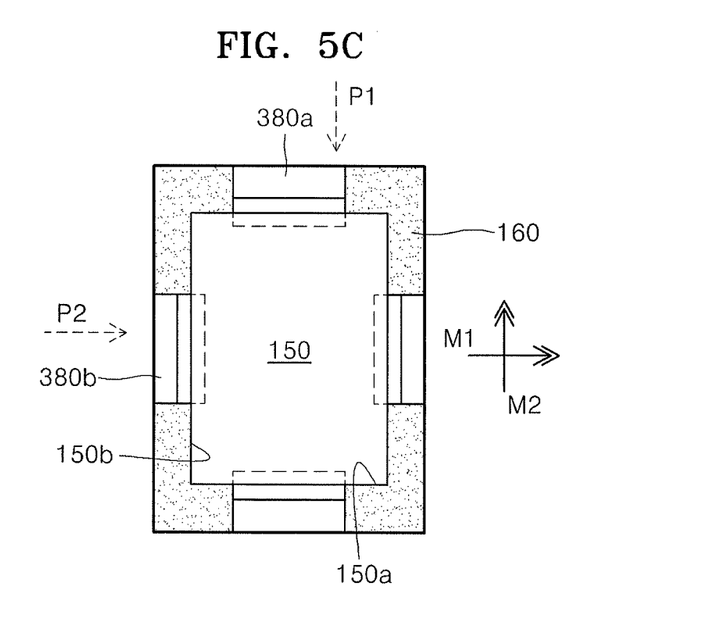

FIGS. 5A through 5E illustrate various arrangement structures of the short-circuit inducing member 180. As shown in FIG. 5A, the short-circuit inducing member 180 may be disposed at a location of the electrode terminal 150 such that the short-circuit inducing member 180 faces the short side portion 150*a*. In other implementations, as shown in FIG. 5B, a short-circuit inducing member 280 may be disposed at a location of the electrode terminal 150 such that the short-circuit inducing member 280 faces the long side portion 150*b*. In other implementations, as shown in FIG. 5C, short-circuit inducing members 380*a* and 380*b* may be disposed at locations facing the short side portion 150*a* and the long side portion 150*b* of the electrode terminal 150.

As described above, directions of deformation for inducing a short-circuit may be variously designed through the short-circuit inducing members 180, 280, 380*a*, and 380*b* having various arrangements. For example, in FIG. 5A, an electric short-circuit may be easily induced when a pressure P1 is applied in a first direction or a bending deformation M1 applied in the first direction. In FIG. 5B, an electric short-circuit may be easily induced when a pressure P2 is applied in a second direction or a bending deformation M2 applied in the second direction. A behavior characteristic of a short-circuit may be changed by varying an arrangement structure of the short-circuit inducing members 180, 280, 380*a*, and 380*b*.

For example, as shown in FIG. 5C, a pair of the short-circuit inducing members 380*a* may be disposed to face the pair of short side portions 150*a* of the electrode terminal 150, and a pair of the short-circuit inducing members 380*b* may be disposed to face the pair of long side portions 150*b* of the electrode terminal 150. The short-circuit inducing members 380*a* and 380*b* may induce an electric short-circuit according to the pressure P1 applied in the first direction and the bending deformation M1 applied in the first direction, and according to the pressure P2 applied in the second direction and the bending deformation M2 applied in the second direction.

Figure 5D:
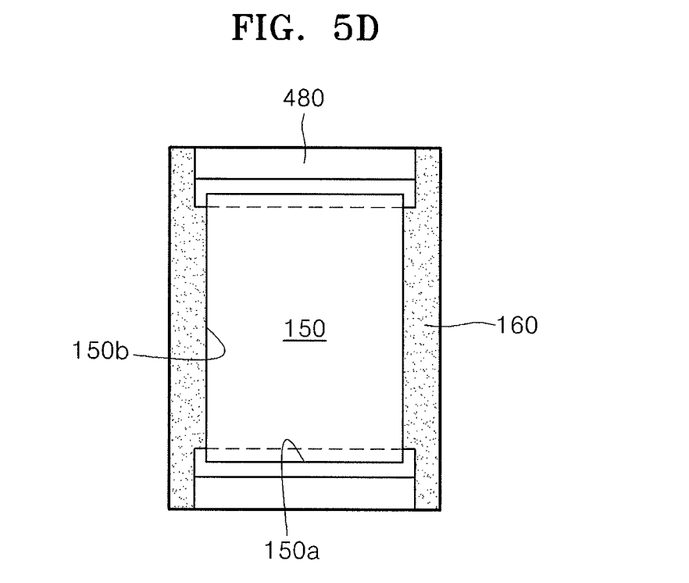

As shown in FIGS. 5A and 5D, short-circuit inducing members 180 and 480 may have a width narrower than or similar to that of a side portion of the electrode terminal 150, for example, the short side portion 150*a*. The lengths of the short-circuit inducing members 180 and 480 may be short or long based on desired operation characteristics. When a length where the short-circuit inducing members 180 and 480, and the electrode terminal 150 face each other is increased, a possibility of an electric short-circuit may be increased regardless of a direction of deformation.

Figure 5E:
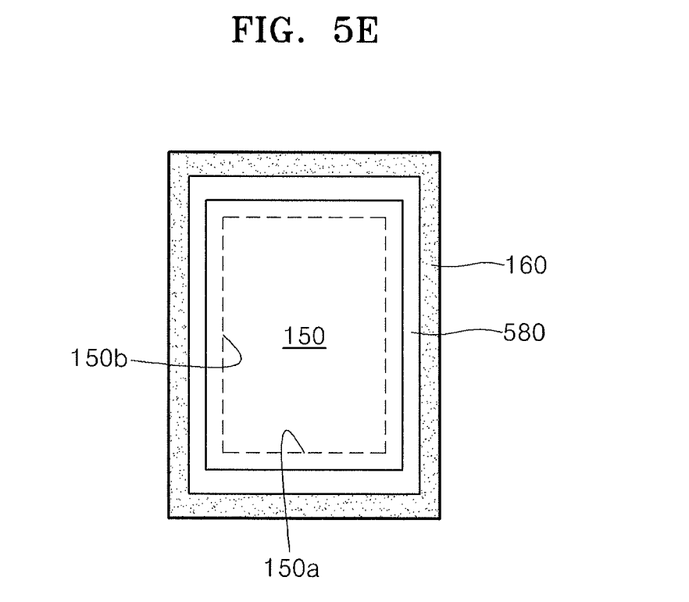

Referring to FIG. 5E, a short-circuit inducing member 580 may be closed-loop shaped and may surround the electrode terminal 150. The short-circuit inducing member 580 may induce an electric short-circuit with respect to deformation in any direction. For example, the short-circuit inducing member 580 may face the electrode terminal 150 along an entire circumference of the electrode terminal 150. Accordingly the short-circuit inducing member 580 may generate an electric short-circuit in all directions of deformation.

Short-circuit operations of a secondary battery according to one or more embodiments will now be described. FIGS.

Figure 6:
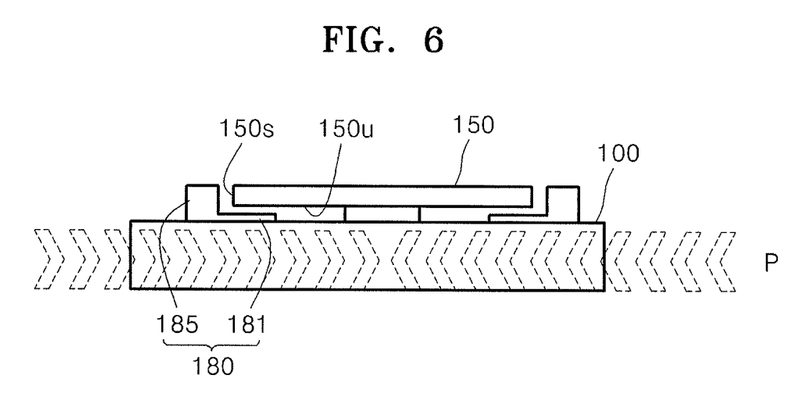
FIGS. 6 and 7 illustrate diagrams for describing short-circuit operations of the short-circuit inducing member, according to embodiments.
Figure 7:
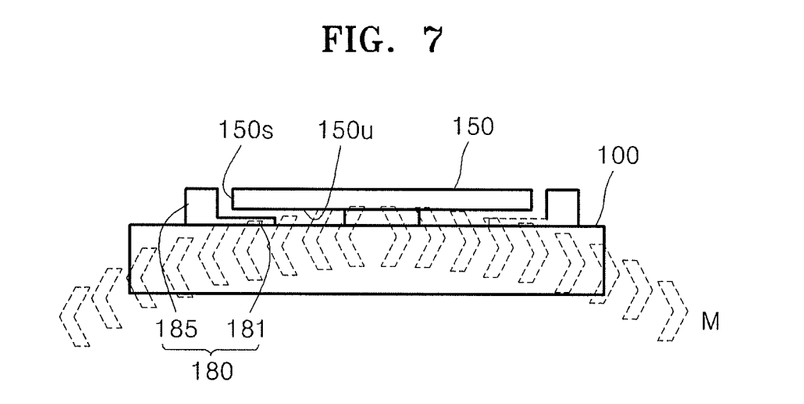

6 and 7 are diagrams for describing short-circuit operations of the short-circuit inducing member 180, according to embodiments.

FIG. 6 illustrates the short-circuit operation of the short-circuit inducing member 180 when a longitudinal pressure P is applied to the cap plate 100. Referring to FIG. 6, the short-circuit inducing member 180 may be deformed in a direction approaching the electrode terminal 150 according to compressive deformation of the cap plate 100, and may include a short-circuit according to contact between the short-circuit inducing member 180 and the electrode terminal 150. For example, the pair of short-circuit inducing members 180 disposed across the electrode terminal 150 may approach each other towards the electrode terminal 150 according to compressive deformation of the cap plate 100, and induce a short-circuit by contacting the electrode terminal 150. Under the longitudinal pressure P, a short-circuit may be generated according to contact between the protruding portion 185 of the short-circuit inducing member 180 and the side surface 150s of the electrode terminal 150.

A characteristic of the deformation shown in FIG. 6 is that the cap plate 100 generates deformation according to the longitudinal pressure P on a plane. In an actual environment, the secondary battery may experience various aspects of deformation, and thus may experience deformation other than that shown in FIG. 6. However, even under complex deformation, a short-circuit may be generated according to the operation shown in FIG. 6, according to compression of the cap plate 100. For example, unless deformation occurs rapidly, the secondary battery may be short-circuited according to the longitudinal pressure P shown in FIG. 6.

FIG. 7 illustrates the short-circuit operation of the short-circuit inducing member 180 when bending M is applied to the cap plate 100. Referring to FIG. 7, the short-circuit inducing member 180 disposed on the cap plate 100 may be displaced such that the short-circuit inducing member 180 contacts the electrode terminal 150, according to the bending M. For example, a short-circuit may be generated according to contact between the base portion 181 of the short-circuit inducing member 180 and the bottom surface 150u of the electrode terminal 150. For example, the base portion 181 may be relatively elevated such that the base portion 181 contacts the bottom surface 150u of the electrode terminal 150, as the short-circuit inducing member 180 rotates in a direction of the bending M by following the bending M of the cap plate 100.

Figure 8:
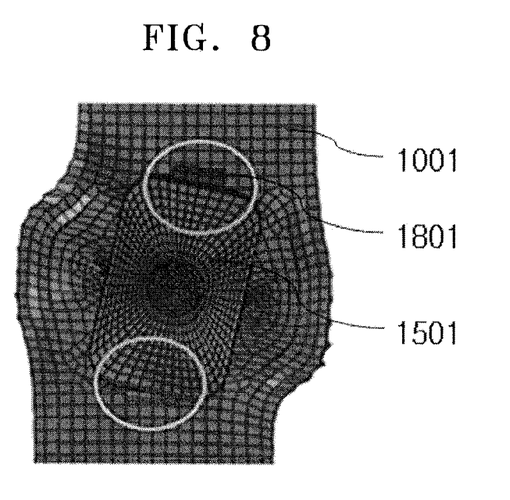
FIGS. 8 and 9 illustrate diagrams showing results of computationally analyzing short-circuit operations of a short-circuit inducing member.
Figure 9:
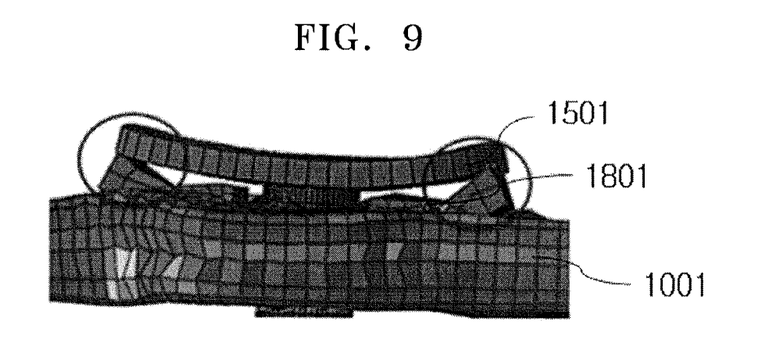

FIGS. 8 and 9 illustrate diagrams showing results of computationally analyzing short-circuit operations of a short-circuit inducing member 1801. According to the computational analysis, longitudinal compression may be applied to a cap plate 1501, and behaviors of the short-circuit inducing member 1801 may be analyzed according to increases in compression rate up to about 10% based on a longitudinal length of the cap plate 1501. A finite element analysis may be used as the computational analysis.

Based on the result of computational analysis, the short-circuit inducing member 1801 may be shown to generate a short-circuit with the cap plate 1501 when a compression rate reaches about 3%. As such, it may be determined that a short-circuit may be generated under a low compression rate (about 3%), and thus a safety accident, such as thermal runaway or ignition, may be prevented.

By way of summation and review, when an external shock or pressure is applied to a secondary battery, a case of the secondary battery, which includes aluminum or aluminum alloy, may be deformed, and thus heat may be generated in the secondary battery. General secondary batteries may not have suitable safety devices for addressing deformation caused by an external shock or pressure. Accordingly, a risk of thermal runaway, ignition, and explosions may be high in such general secondary batteries.

According to an embodiment, by providing a secondary battery capable of inducing an internal short-circuit, not only thermal runaway, but also a safety accident, such as an ignition or an explosion, caused by deformation of the secondary battery may be prevented. A secondary battery may include a short-circuit inducing device capable of inducing an internal short-circuit even when a degree of deformation is relatively low, for example, even when a compression rate is low.

As described above, according to the one or more of the above embodiments, a secondary battery may have a short-circuit inducing device for inducing an internal short-circuit in response to wide-ranging deformation, regardless of deformation aspects or directions of compressive deformation or bending deformation applied to the secondary battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A secondary battery, comprising:
an electrode assembly;
a case that accommodates the electrode assembly;
a cap plate that seals the case;
an electrode terminal assembled to penetrate through the cap plate; and
a short-circuit inducing member that is fixed to a top surface of the cap plate, the short-circuit inducing member being displaceable according to a deformation of the cap plate to induce a short-circuit by contact with the electrode terminal,
wherein the short-circuit inducing member surrounds a corner portion of the electrode terminal.

2. A secondary battery, comprising:
an electrode assembly;
a case that accommodates the electrode assembly;
a cap plate that seals the case;
an electrode terminal assembled to penetrate through the cap plate; and
a short-circuit inducing member that is fixed to a top surface of the cap plate, the short-circuit inducing member being displaceable according to a deformation of the cap plate to induce a short-circuit by contact with the electrode terminal,
wherein the short-circuit inducing member includes:
a base portion having a relatively wide width, the base portion being disposed on the top surface of the cap plate; and
a protruding portion having a relatively narrow width, the protruding portion protruding from the base portion towards above the cap plate.

3. The secondary battery as claimed in claim 2, wherein:
the base portion and the protruding portion together form a stepped portion, and
the stepped portion provides a space that accommodates a corner portion of the electrode terminal.

4. The secondary battery as claimed in claim 3, wherein:
the base portion faces a bottom surface of the electrode terminal and the protruding portion faces a side surface of the electrode terminal, and
the short-circuit inducing member surrounds the corner portion of the electrode terminal where the bottom surface and the side surface of the electrode terminal meet.

5. The secondary battery as claimed in claim 4, wherein:
the protruding portion and the side surface of the electrode terminal contact each other and induce a short-circuit during compressive deformation of the cap plate, and
the base portion and the bottom surface of the electrode terminal contact each other and induce a short-circuit during bending deformation of the cap plate.

6. A secondary battery, comprising:
an electrode assembly;
a case that accommodates the electrode assembly;
a cap plate that seals the case;
an electrode terminal assembled to penetrate through the cap plate; and
a short-circuit inducing member that is fixed to a top surface of the cap plate, the short-circuit inducing member being displaceable according to a deformation of the cap plate to induce a short-circuit by contact with the electrode terminal,
wherein:
the electrode terminal has a rectangular shape having a pair of short side portions and a pair of long side portions, and
the short-circuit inducing member includes a pair of members disposed to face the pair of long side portions, and a pair of members disposed to face the pair of short side portions.

7. A secondary battery, comprising:
an electrode assembly;
a case that accommodates the electrode assembly;
a cap plate that seals the case;
an electrode terminal assembled to penetrate through the cap plate; and
a short-circuit inducing member that is fixed to a top surface of the cap plate, the short-circuit inducing member being displaceable according to a deformation of the cap plate to induce a short-circuit by contact with the electrode terminal,
wherein the short-circuit inducing member has a closed-loop shape and surrounds the electrode terminal.

8. A secondary battery, comprising:
an electrode assembly;
a case that accommodates the electrode assembly;
a cap plate that seals the case;
an electrode terminal assembled to penetrate through the cap plate; and
a short-circuit inducing member that is fixed to a top surface of the cap plate, the short-circuit inducing member being displaceable according to a deformation of the cap plate to induce a short-circuit by contact with the electrode terminal,
wherein:
an insulating gasket is on the top surface of the cap plate, together with the short-circuit inducing member, and
the insulating gasket includes an exposing portion that exposes the short-circuit inducing member.

9. The secondary battery as claimed in claim 8, wherein the insulating gasket covers and insulates the cap plate, and exposes the short-circuit inducing member to the electrode terminal.

10. The secondary battery as claimed in claim 8, wherein the insulating gasket includes a first portion inserted into a terminal hole of the cap plate through which the electrode terminal penetrates, and a second portion formed at the top surface of the cap plate and extending from the first portion.

11. The secondary battery as claimed in claim 10, wherein the second portion includes the exposing portion.

* * * * *